(No Model.) 6 Sheets—Sheet 2.
J. F. FISCHER.
APPARATUS FOR LAYING PIPES.
No. 436,914. Patented Sept. 23, 1890.
Fig. 9.
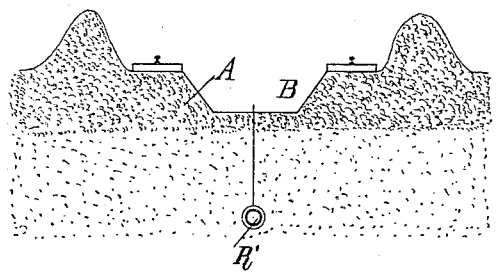
Fig. 10.
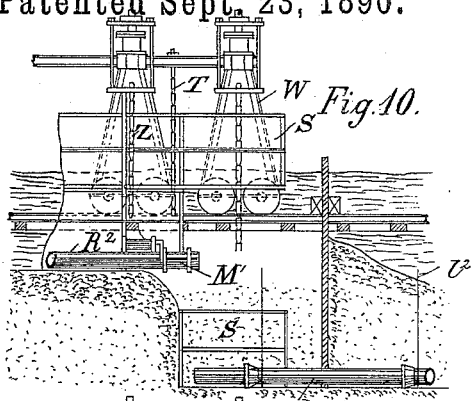
Fig. 11.
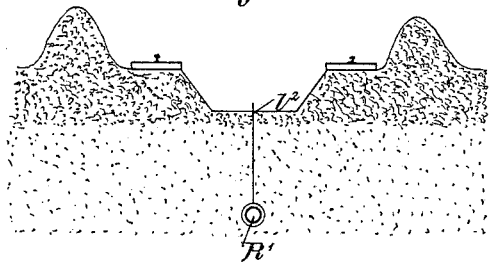
Fig. 12.
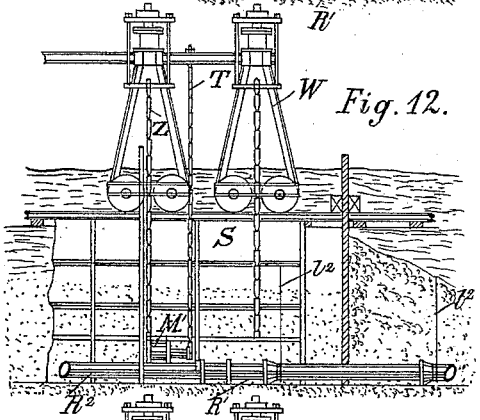
Fig. 13.
Fig. 15.
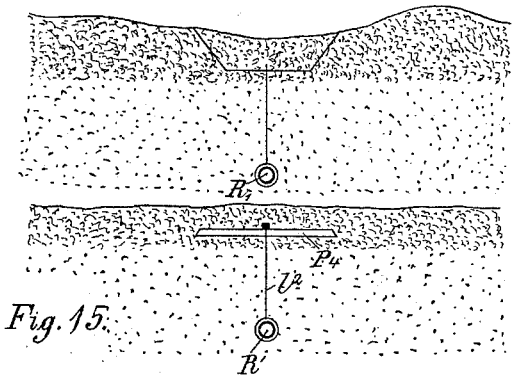
Fig. 14.
Fig. 16.
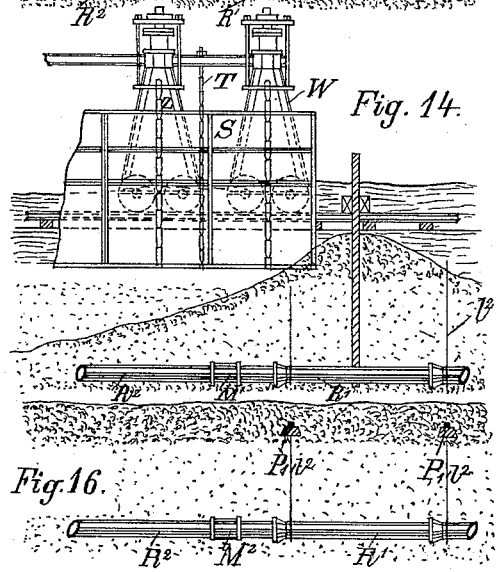
Witnesses
Inventor
J. F. Fischer
By his Attorney
Herbert W. T. Jenner.

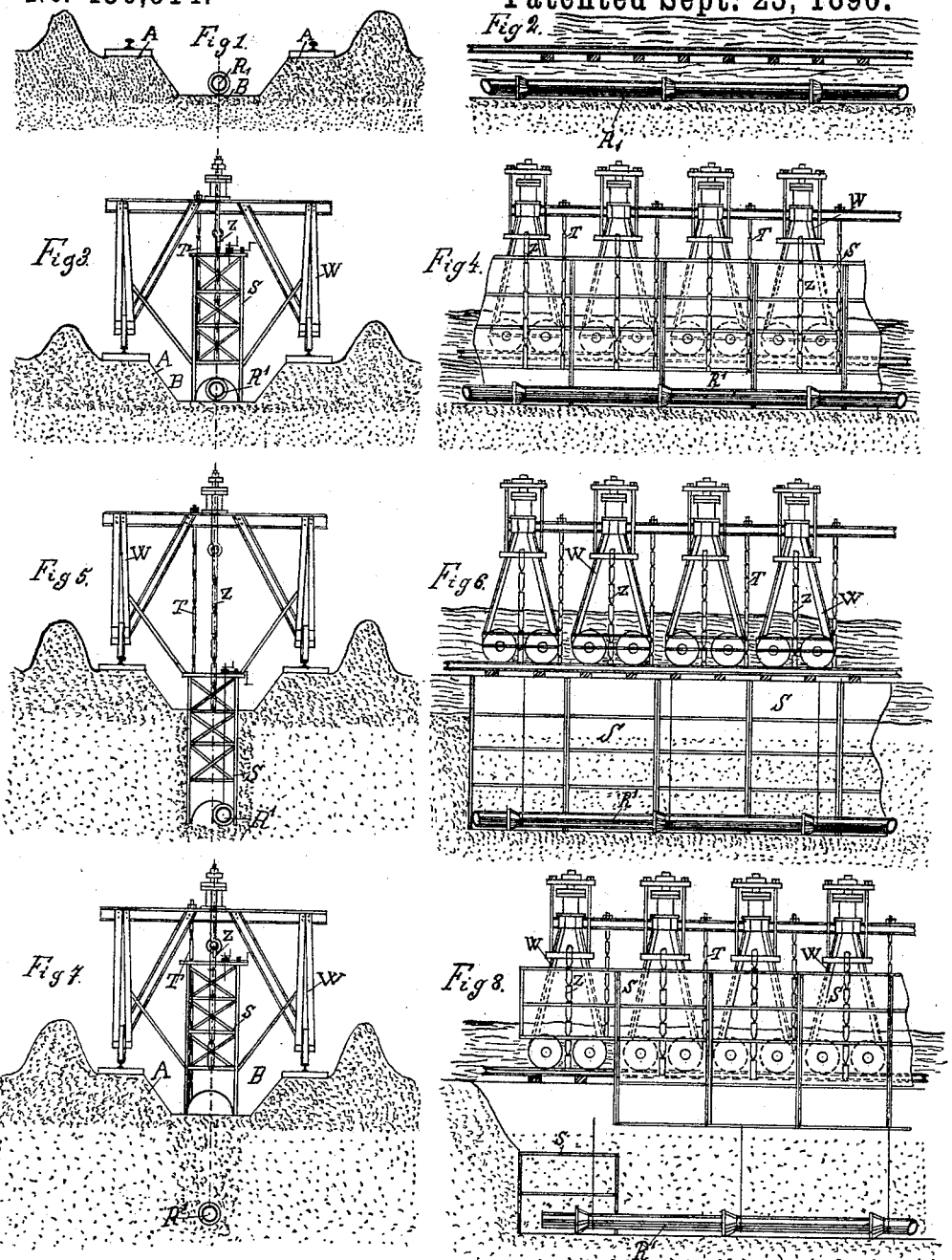

(No Model.) 6 Sheets—Sheet 3.

J. F. FISCHER.
APPARATUS FOR LAYING PIPES.

No. 436,914. Patented Sept. 23, 1890.

Witnesses
C. T. Beer
W. H. H. Knight

Inventor
J. F. Fischer
By his Attorney
Herbert W. T. Jenner.

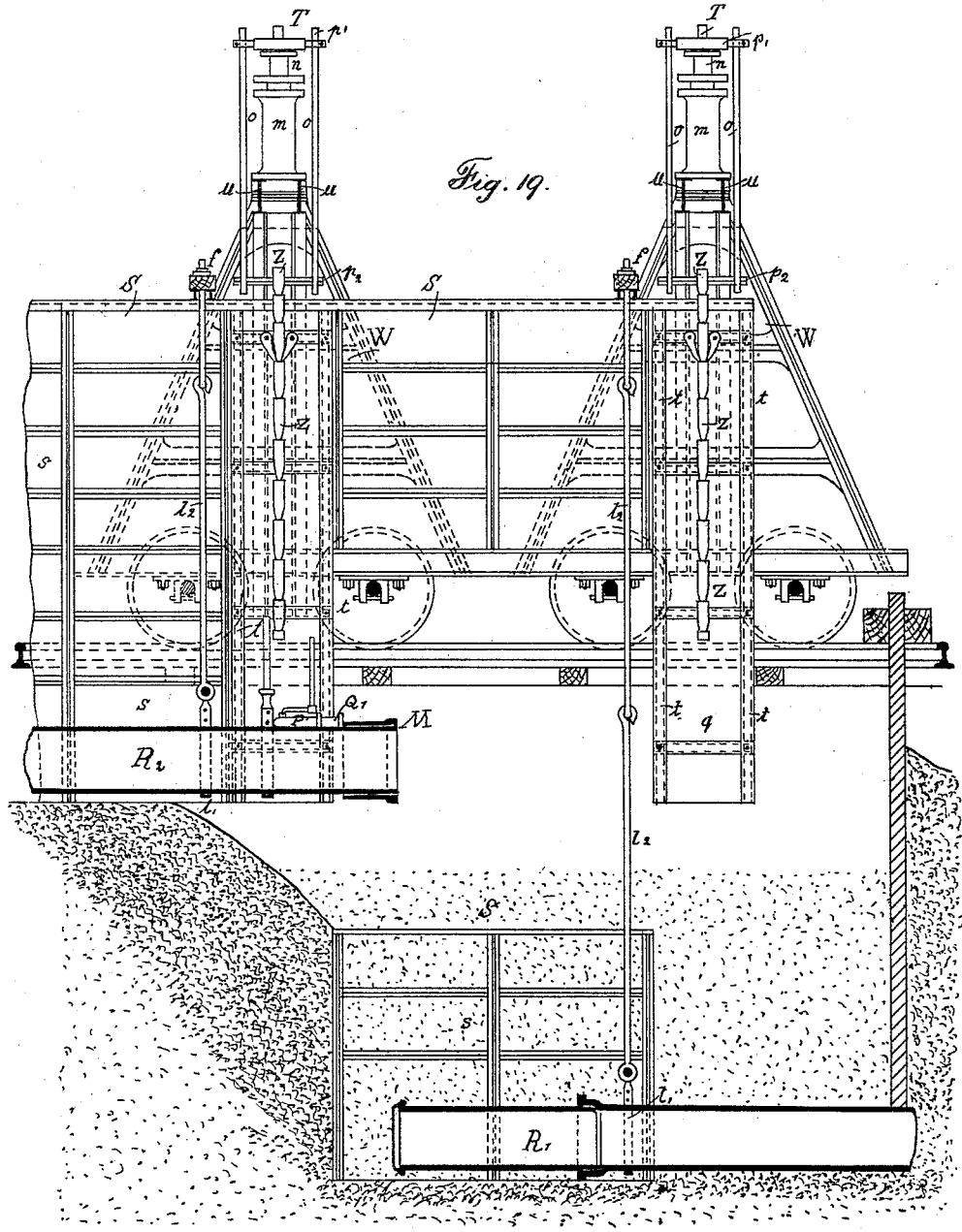

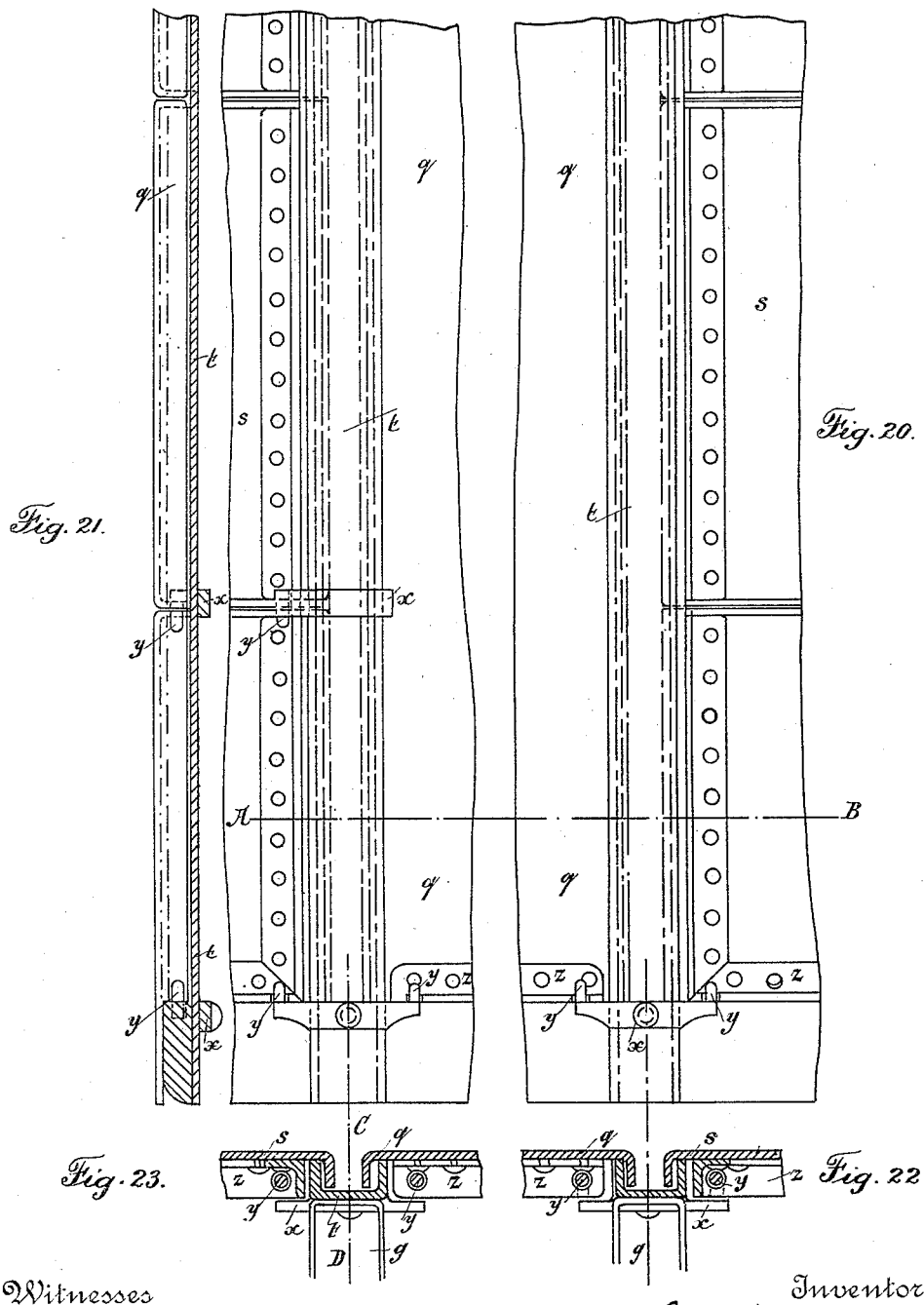

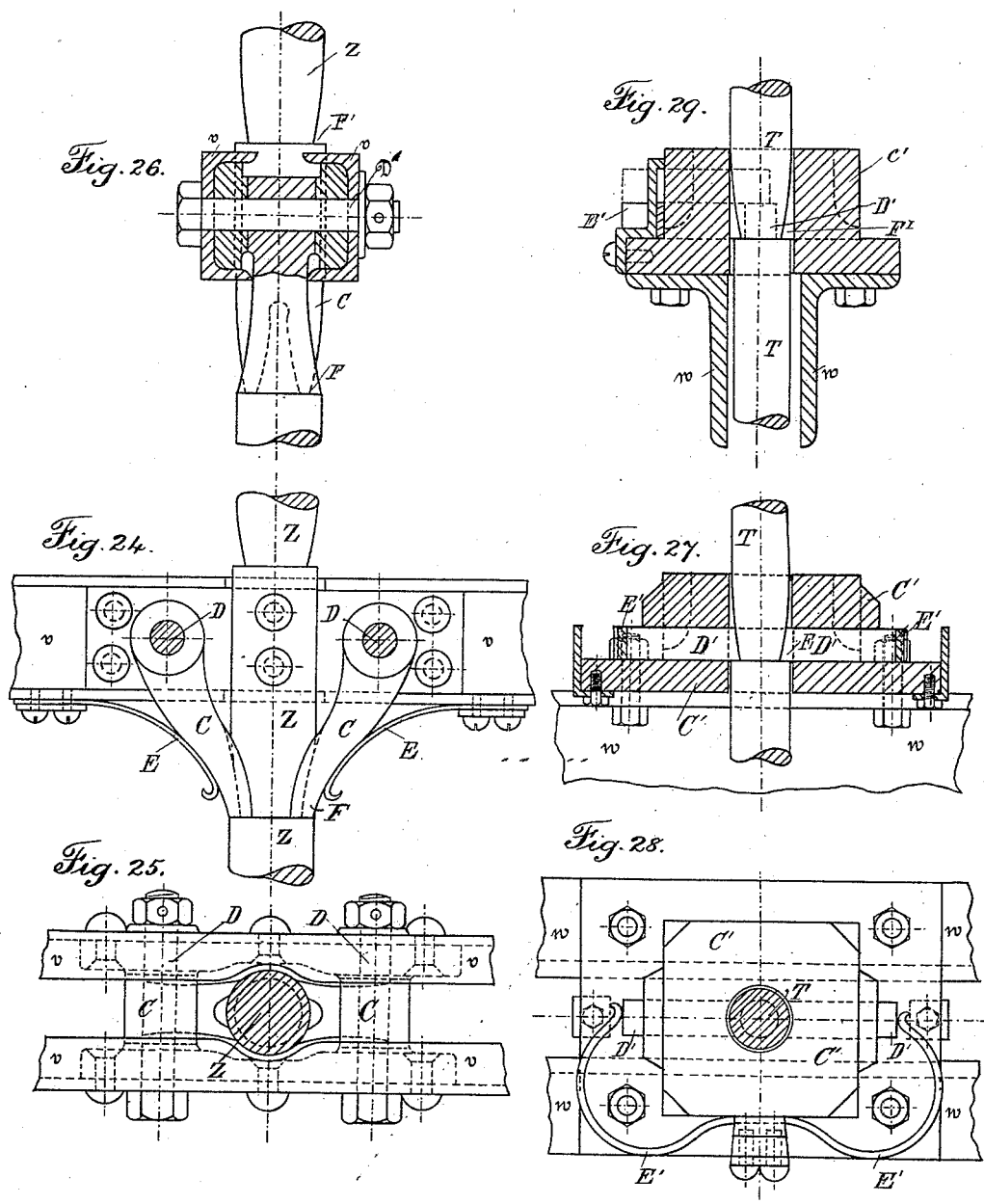

UNITED STATES PATENT OFFICE.

JOHANN FRIEDRICH FISCHER, OF WORMS, GERMANY.

APPARATUS FOR LAYING PIPES.

SPECIFICATION forming part of Letters Patent No. 436,914, dated September 23, 1890.

Application filed July 5, 1889. Serial No. 316,628. (No model.)

*To all whom it may concern:*

Be it known that I, JOHANN FRIEDRICH FISCHER, engineer, a subject of the Duke of Saxe-Coburg-Gotha, residing at Worms, in the Grand Duchy of Hesse, and German Empire, have invented certain new and useful Improvements in Apparatus for Laying Pipes; and I do hereby declare the following to be a full, clear, and exact description of the invention, such as will enable others skilled in the art to which it appertains to make and use the same.

The present invention relates to apparatus for laying a line of pipes (without its being necessary to drive in sheet-piling, employ divers, or use any special pneumatic or congealing method) in watery ground, during inundations, or in any marshy locality.

Figure 17:
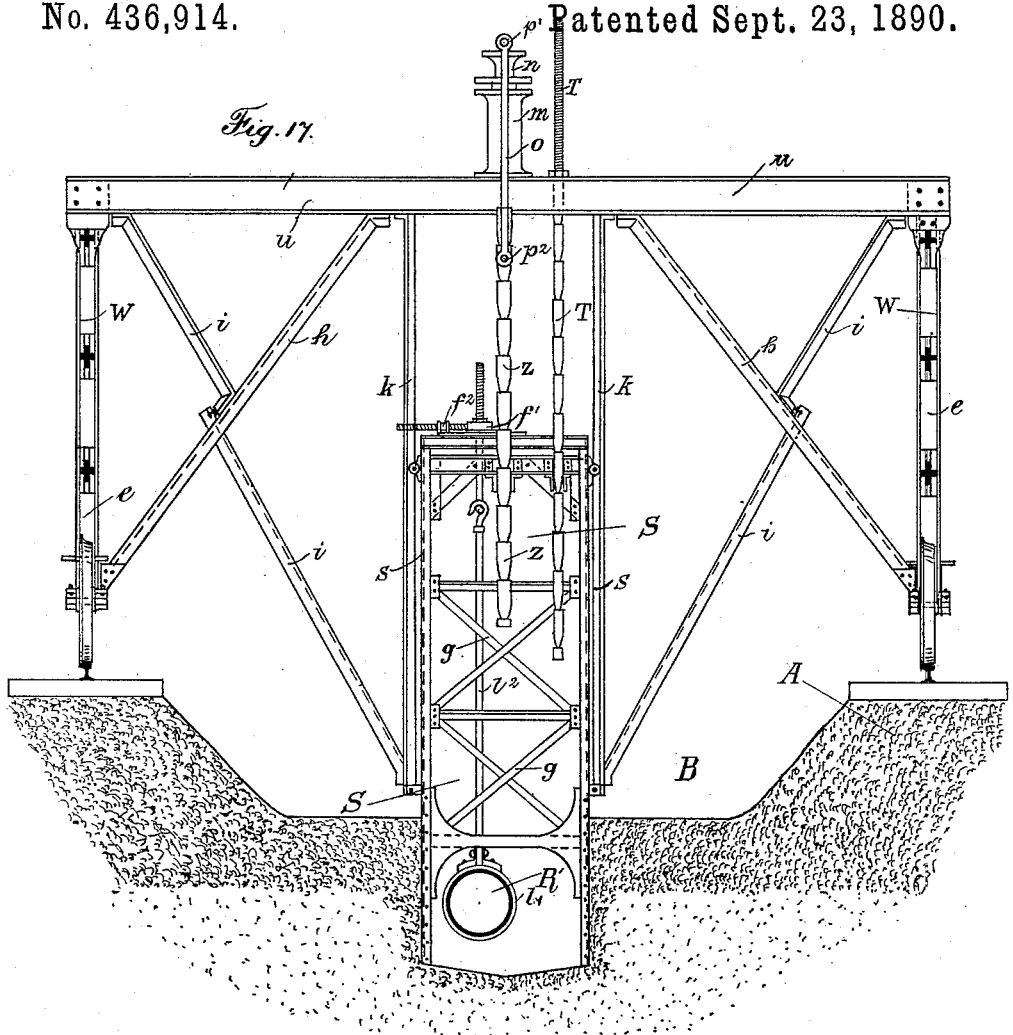
Figure 18:
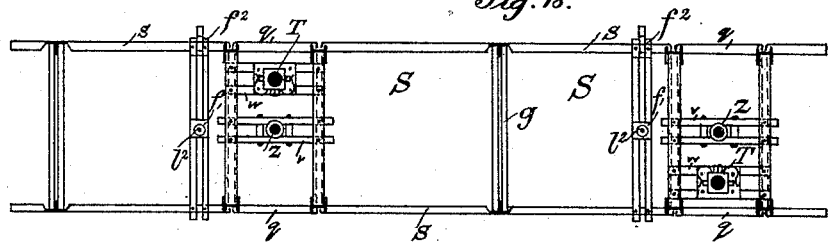

In the accompanying drawings, Figures 1 and 2 show the pit, together with the line of pipes laid in the firm ground, in a cross-section and a longitudinal section. Figs. 3 and 4 represent in a cross-section and a longitudinal section the transporting-scaffold placed above the pit and the line of pipes, together with the sinking-frame suspended to it. Figs. 5 and 6 illustrate the sunken frame, together with the line of pipes, in a cross-section and a longitudinal section. Figs. 7 and 8 show the sinking-frame in a cross-section and a longitudinal section after it has been raised (lifted or hoisted) again by the hydraulic-draft winches mounted on the transporting-scaffold. Figs. 9 and 10 illustrate in a cross-section and a longitudinal section the sinking-frame for the second line or section of pipes, with the double socket and the appertaining pressure-winch at the straight or pointed end of the line of pipes. Figs. 11 and 12 show in a cross-section and a longitudinal section the connection of two lines or sections of pipes following each other under water by means of the hydraulic-pressure winch. Figs. 13 and 14 illustrate in a cross-section and a longitudinal section the sinking-frame for the second line of pipes after being raised again when the connection of two lines of pipes have been carried out. Figs. 15 and 16 show the line of pipes ready laid in the swampy ground. Figs. 17 and 18 represent in a cross-section and a longitudinal section the traveling transporting-scaffold and the sinking-frame (caisson) on a larger scale. Fig. 19 is a ground plan of one part of the sinking-frame on a smaller scale. Figs. 20, 21, 22, and 23 show the supple connection of the separate parts of the sinking-frame. Figs. 24, 25, and 26 show the stop-gear for the draw-spindles; and, finally, Figs. 27, 28, and 29 illustrate the stop-gear for the bearing-spindles.

In laying a line of pipes after the method described hereinafter a pit B is excavated in the ground, as shown in Fig. 1, and a short line or section of pipes R' is put together on the solid ground at the bottom of the pit. This line may consist of any convenient number of pipe-lengths jointed together in any approved manner. The sides of the trench or pit are ramped to form two ledges A for the sleepers and track-rails of the pipe-laying apparatus. As soon as a line of pipes R' has been laid and put together in any desirable length in this way in the pit B, a wrought-iron jointed sinking-frame S (which is equal in length to the line of pipes R' and is suspended by means of draw-spindle Z and bearing-spindle T to the traveling transport-scaffold W) is set upon the ground above the line of pipes R', for the purpose of lowering said pipes. Figs. 3 and 4 show in a cross-section and a longitudinal section this position of the sinking-frame S and the transporting-scaffold W above the pit B, whereas Figs. 17 and 18 illustrate a front and side view of the sinking-frame and the transporting-scaffold on a larger scale.

The two sides $s$ of the sinking-frame are of sheet-iron plates connected by means of angle-iron and shoved off from each other at suitable distances by the cross-bars (lattice-work) $g$. The sinking-frame S is open at the top and at the bottom, and is placed above the connected line of pipes R', which is suspended in pipe-straps $l'$ $l^2$. The latter are adjustable both in respect to height and lateral position by means of the supports $f'$ and $f^2$ provided with operating-screws, so that in this way the position of the line of pipes can be regulated from the firm ground.

The sinking-frame is suspended in a suitable number of transporting-scaffolds W, which consist of two side framings $e$ and of two double-T-iron beams $u$, which connect the side framings $e$ and also support the cylinder $m$ of the hydraulic lifting apparatus. The latter is connected by the piston-rod $n$, the upper and lower cross-bars $p'$ and $p^2$, and the draw-rods $v$ with the draw-spindles Z. In order to stiffen the transporting-scaffold, the braces $h$ and $i$ are applied, and the angle-irons $k$, that serve as guides for the sinking-frame S, are fastened to the said braces $i$.

The joint-like (supple) connection of those parts of the sinking-frame S that are raised direct by the draw-spindles Z with the other parts of the frame near to them is represented in Figs. 20, 21, 22, and 23 in a front view, a side view, and in horizontal section on line A B in Fig. 20. At the said place of connection a sheet-iron plate $q$ is fastened to the frame and has its ends bent around into the channel-iron supports $t$. The sides $s$ are similar to the plates $q$ and are coupled to supports $t$ in a similar manner. The cross-bars $g$ are arranged between the supports $t$, and to these cross-bars are secured the beams $v$, which support the draw-spindles Z, and the beams $w$, which support the bearing-spindles T. The latter are attached, as may be seen in the projection represented in Fig. 18, alternately on one and on the other side of the draw-spindles, for the purpose of lifting the sinking-frame uniformly.

In the Figs. 3 to 14, showing the general arrangement of all the parts, the bearing-spindles T are drawn beside the draw-spindles Z, on account of the small dimensions, (scale,) and it is supposed that cross-beams are arranged to connect the different parts of the transporting-frame and bear the supports for the draw-spindles. These beams may, however, be dispensed with, as is shown in Figs. 17 to 19, illustrating details. At the lower ends of the girders $t$ bearing-plates $x$ are screwed on, and are provided with centering-pins $y$, which work into holes made in the bracket-joints $z$, riveted to the adjoining plates $q$ and sides $s$. According to the height of the sinking-frame, several such bearing-plates $x$, with centering-pins $y$, can be attached to the girders $t$. These pin-connections make the sinking-frame pliant in a certain measure whenever a part of the latter is raised by the draw-spindles by means of the cross-bars (lattice-work) $g$, which connect the girders $t$. As soon as the transporting-scaffold W has been properly placed and set, together with the sinking-frame S, over the line of pipes R', the stop-gear for the draw-spindles Z and bearing-spindles T, that support the frame S, is disengaged and the sinking-frame thus disconnected from the transporting-scaffold.

The stop-gear for the draw-spindles Z is represented in a vertical side view in Fig. 24, in a ground plan in Fig. 25, and in a vertical cross-section in Fig. 26. It consists of latches C, which can rotate round the bolts D. Said latches are fastened to the girders $v$, and are pressed by springs E, likewise attached to the girders $v$, into notches F, which are made in draw-spindles Z, in such a way that whenever the latter move upward they are bound to take the latches C along with them, whereas whenever the draw-spindles Z move downward the latches are automatically disengaged.

The stop-gear for the bearing-spindles T is represented in Figs. 27 and 29 in two vertical sections and in a ground plan in Fig. 28. This gear consists of a box-like shell C', fastened to the girders $w$ and provided with a center opening for the bearing-spindle T to pass through. Shell C' has besides a slit running at right angles to the bearing-spindle T, in which two slides D' move and are pressed by means of the springs E' into the notches F' of the bearing-spindle. Whenever the sinking-frame S is lifted by draw-spindles Z, the slides D' unlatch automatically and slide along the bearing-spindles T to the next notch F', into which they slip and thus hold fast the sinking-frame until the draw-spindles commence to lift again. As soon as these stop contrivances for the draw and bearing spindles are disengaged and the connection between the sinking-frame S and the transporting-scaffold W is broken off the line of pipes R' is suspended by means of the pipe-straps $l'$ $l^2$, attached to the supports $f'$ and $f^2$, fastened to the sinking-frame. These devices allow, as already mentioned, the position of the line of pipes to be regulated both in a vertical and in a horizontal direction. The ends of the pipes are stopped up, so that no earth can enter, and the pipes are then suspended by the supports $f'$ $f^2$ to the sinking-frame S, and the dredging or excavating of the earth inside of this sinking-frame (by means, for instance, of excavator-buckets) is begun. The men working the excavator stand on the scaffolding laid right across the caisson, (sinking-frame,) and the filled buckets are hoisted and emptied clear of the transporting-scaffold. As the work of excavating continues the line of pipes R', together with the caisson S, keeps on sinking till the level has been reached to which it is intended to sink the line of pipes. This position is represented in cross and longitudinal section in Figs. 5 and 6. The laying and placing of the line of pipes, which has been suspended, as already described, at one side of the sinking-frame S till then, now commences. It is brought toward the middle of the sinking-frame S and the pipe-strap rod $l^2$ is disengaged from the supports $f'$ and $f^2$ of the frame S. In consequence of its peculiar jointing and packing, the line of pipes R' is supple in a measure in its joints, so that any uneven sinking of the separate parts of the caisson S, caused by unequal excavating at one point or the other, does no damage, and the sinking frame itself is also pliant in its joints up to a certain measure. Owing on the one hand to the fact that a little play is left by the peculiar method in which the parts of the sinking-frame are connected at the joints, and owing on the other hand to the weight being uniformly distributed by the way in which the line of pipes is suspended to the sinking-frame, there is no possibility of the latter sinking unevenly or more to one side than the other. Before the pipe-straps $l'$ $l^2$ are disengaged from the supports $f'$ and $f^2$ the line of pipes R′ is bedded on the level intended for it by raising or letting go the said support and is held in position then by filling in gravel underneath and around it. As soon as the line of pipes R′ has been lowered to its intended depth and the filling in with gravel has begun the lifting of the sinking-frame is commenced. The considerable weight of the sinking-frame and the enormous pressure of the earth bearing on its sides, combined with the friction thus caused, necessitate a very great amount of power to extract the sinking-frame from its position. The power required for this purpose is furnished by the hydraulic cylinders $m$, already mentioned, in combination with the draw-spindle Z. The notches F of the latter, and already mentioned herein, correspond in length apart with the strokes of the hydraulic piston, so that the sinking-frame is raised a certain distance by each stroke of the piston equal to the length of said stroke. In order to hold fast the sinking-frame at the height to which it has been raised when the piston descends for a fresh stroke, there are also notches F′ on the vertical bearing or brake spindles T corresponding with the stroke of the piston, so that the sinking-frame is held suspended every time the piston descends by the self-acting stop-gearings.

In order to connect the second line or section of pipes $R^2$, which is put together and sunk in the same way, with the first line under water and without the help of divers, the last part of the sinking-frame, or the last link of it, in the working direction is disengaged in the pit before the sinking-frame is hoisted out. This end section of the frame is left in the pit and prevents the end of the pipes from getting covered over with sand. The sinking-frame S, or rather that part it, is illustrated in cross and longitudinal section in Figs. 7 and 8. In a similar manner the first joint or part of the first joint of the sinking-frame S is dispensed with for sinking the line or section of pipes $R^2$ that has to be sunk in line with the section R′, so that the connection of the end pipe in the pit can be made. Figs. 9 and 10 represent this position in a cross-section and a longitudinal section. Before lowering the pipes the straight end of the line of pipes $R^2$ that has to be jointed is provided with a double socket M′, which is forcibly slid over the end pipe of section R′, when the two said sections R R′ have been brought to form one continuous line of pipe.

As soon as the connecting of the two lines of pipes R′ and $R^2$ has been carried out the sinking-frame S may be hoisted out by means of the hydraulic winches mounted on the transporting-scaffold W and operating the draw-spindles Z. This position is represented in Figs. 13 and 14. The sinking-frame S may then be moved on by means of the transporting-scaffold W and put in position to sink another line of pipes $R^2$. On hoisting the sinking-frame out of the excavation the floating earthy mass rushes into the opening thus left, which has to be filled up with some kind of suitable material. The pit B is then filled up, too, and the draw-rods $l^2$ of the pipe-straps that reach up through the firm ground onto the level are provided with anchor-plates $P^4$, in order to make the firm ground assist in supporting the line of pipes just laid. This arrangement is to be seen in a cross-section and in a longitudinal section in Figs. 15 and 16.

The apparatus hereinbefore described can also be used for laying foundations, the pipes and their supports being merely omitted.

What I claim is—

1. The combination, with the transporting-scaffold provided with vertical guides, of the sinking-frame sliding between said guides, and a lifting device secured to the said scaffold for raising the said frame, substantially as set forth.

2. The combination, with the transporting-scaffold provided with vertical guides, of the sinking-frame sliding between said guides, the notched draw-spindle, a lifting device secured to the said scaffold for reciprocating said draw-spindle, the stationary notched bearing-spindle, and latches secured to the said frame and adapted to engage with the said spindles, substantially as and for the purpose set forth.

3. The combination, with the transporting-scaffold provided with vertical guides, of a longitudinally-pliable sinking-frame formed of jointed plates separated by cross-bars, and a lifting device secured to the scaffold for raising the said frame, substantially as and for the purpose set forth.

4. The combination, with the sinking-frame and the vertical strap adapted to be secured to the pipe, of the screws and screw-threaded blocks supported by said frame and adapted to move the said pipe-supporting strap vertically or transversely, as desired, substantially as set forth.

5. The combination, with the vertical trough-shaped supports, of the cross-bars secured between said supports, the side plates having flanged ends engaging with said supports, and the pins secured to the said supports and connected with the side plates, whereby the frame-work is rendered longitudinally flexible, substantially as and for the purpose set forth.

6. The combination, with the vertical supports, of the side plates connected to said supports, the cross-bars secured between said supports, the girders v and w, secured to said cross-bars, and the draw-spindles and bearing-spindles respectively connected to said girders upon opposite sides of the center of gravity of the frame, whereby it may be lifted uniformly, substantially as and for the purpose set forth.

In testimony whereof I affix my signature in presence of two witnesses.

JOHANN FRIEDRICH FISCHER.

Witnesses:
 SIMON SERVOS,
 JULIUS STRAUSS.